United States Patent [19]
Chambers

[11] Patent Number: 5,637,068
[45] Date of Patent: Jun. 10, 1997

[54] METHOD AND APPARATUS FOR CHANGING A SAW ASSEMBLY

[75] Inventor: Glen O. Chambers, Woodland, Wash.

[73] Assignee: U.S. Natural Resources, Inc., Vancouver, Wash.

[21] Appl. No.: 499,777

[22] Filed: Jul. 7, 1995

[51] Int. Cl.$^6$ .................................................. B23Q 3/157
[52] U.S. Cl. .............................. 483/1; 83/665; 144/374; 144/376; 483/30; 483/31
[58] Field of Search ................................. 483/1, 13, 30, 483/31; 83/665, 666, 508.1, 508.3, 409.1; 144/237, 374, 376

[56] References Cited

U.S. PATENT DOCUMENTS 4,843,933  7/1989  Seki et al. ........................ 83/508.3 X

FOREIGN PATENT DOCUMENTS 964304  7/1964  United Kingdom ................... 83/665

Primary Examiner—William R. Briggs
Attorney, Agent, or Firm—Robert L. Harrington

[57] ABSTRACT

A saw changer for changing a saw assembly mounted on an arbor of a saw machine. A carrier is positioned for powered sliding movement axially along the saw assembly from a position under the arbor to a position free of the arbor. The carrier includes holders that are raised into position for holding the saw assembly and through powered axial movement of the carrier, for removing the saw assembly from the arbor. Upon removal, the saw assembly is lifted from the carrier and a replacement saw assembly is mounted on the carrier for placement onto the arbor.

7 Claims, 6 Drawing Sheets

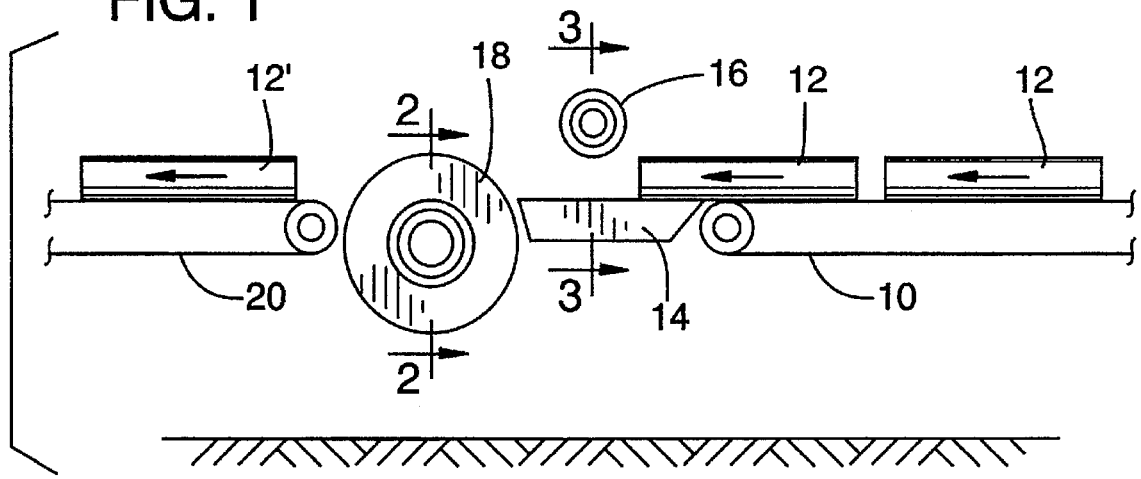
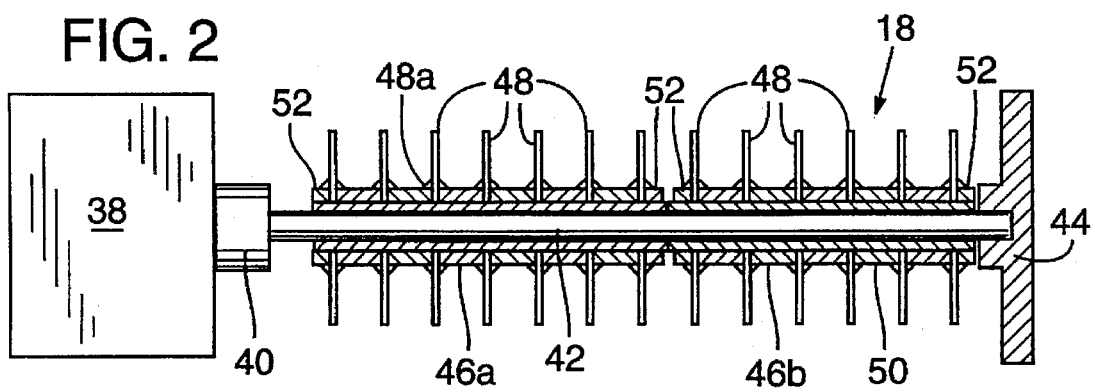
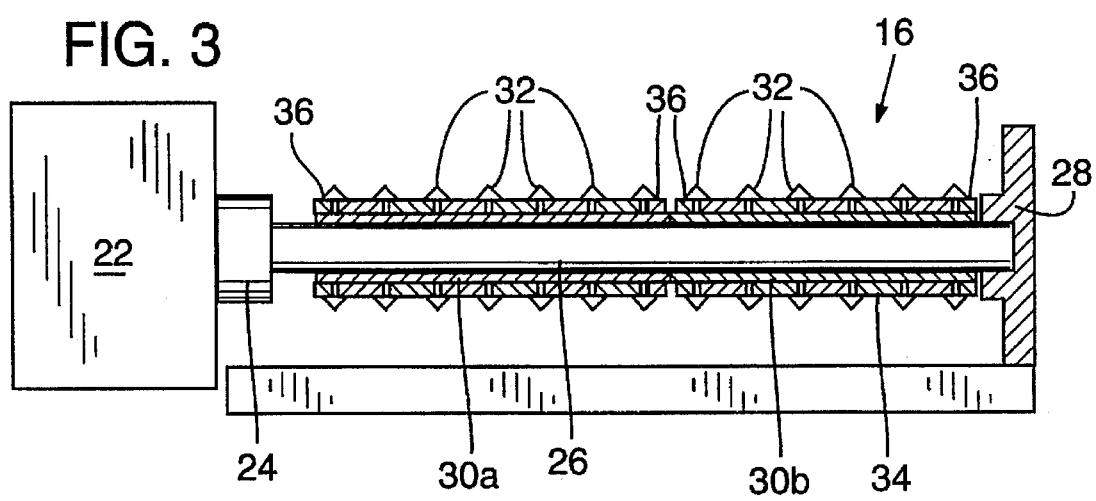

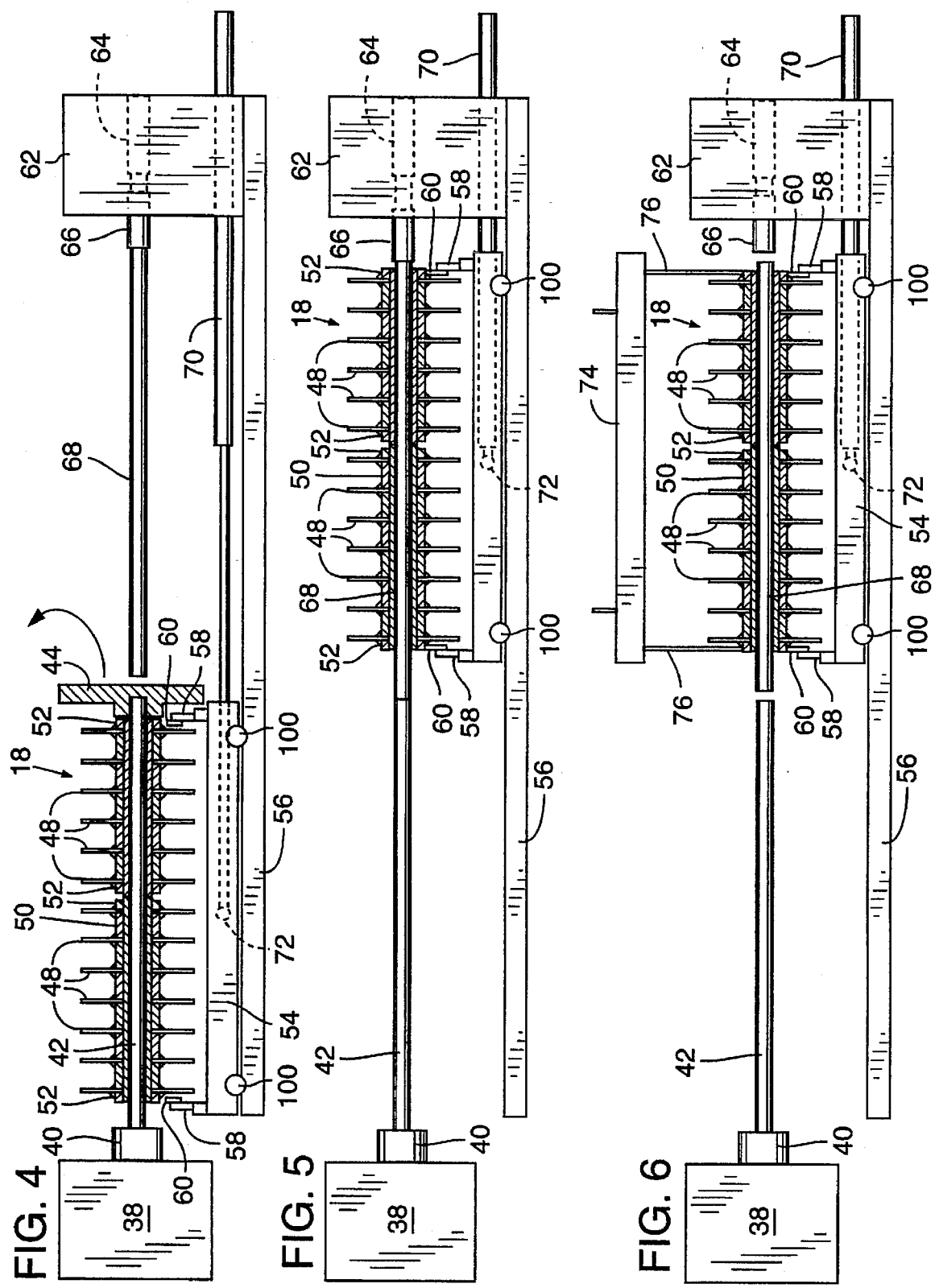

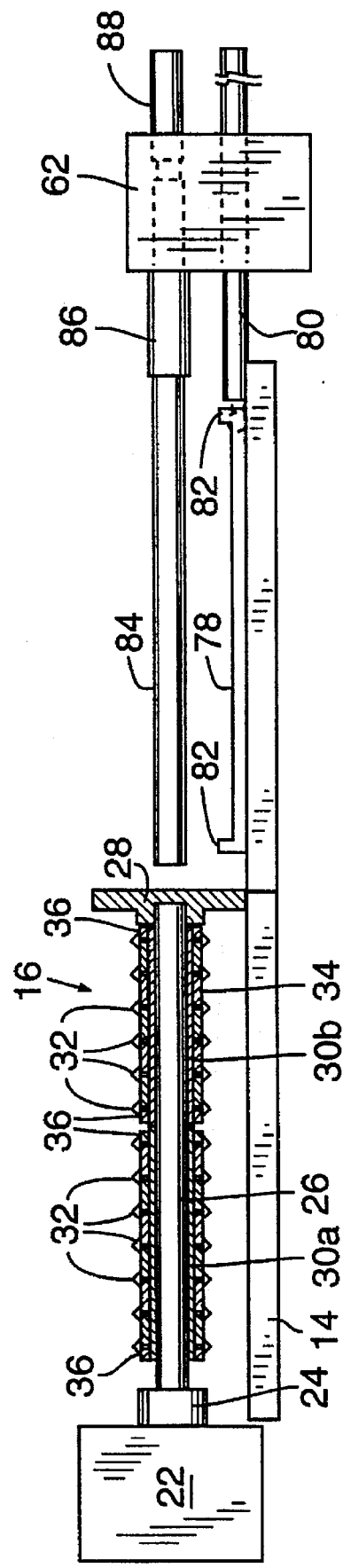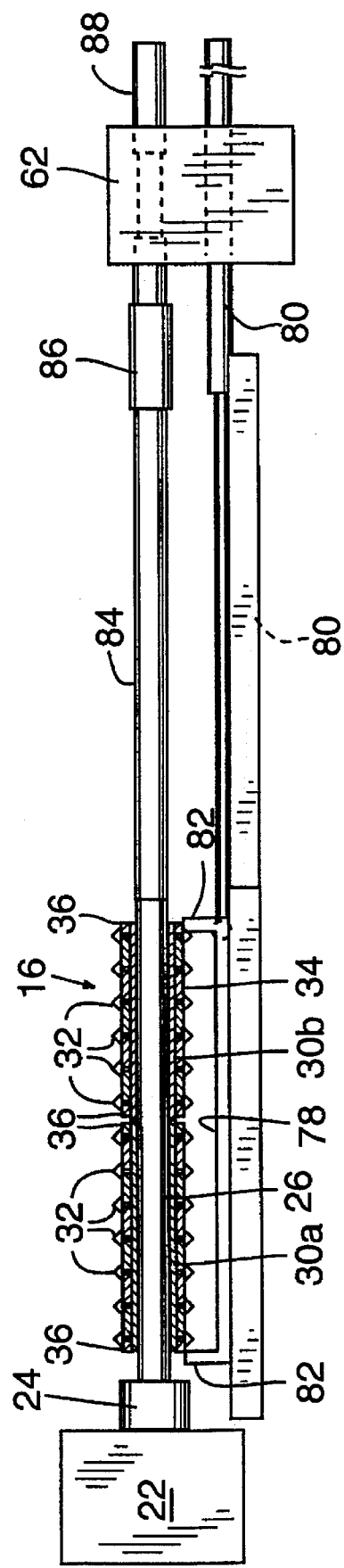

METHOD AND APPARATUS FOR CHANGING A SAW ASSEMBLY

FIELD OF THE INVENTION

This invention relates to a saw machine (gang saw) for example wherein sheets or billets of wood material are cut into strips by an assembly of multiple circular saw blades arranged in side-by-side spaced relation, and more particularly it relates to a method and apparatus for removing and replacing the saw assembly in the machine.

BACKGROUND OF THE INVENTION

A saw machine or gang saw typically includes an arbor rotatively driven by its connection at one end to a motor. The other end is rotatably supported by a bearing mount provided in a removable gate. A sleeve is slidably mounted on the arbor (at the gate end) and is keyed to the arbor. Saws and spacers are mounted on the sleeve and fixed thereto in a desired spaced relation. The saws, spacers and sleeves together with end nuts holding the spacers and saws onto the sleeves are referred to as the saw assembly.

When the saws become dull or the spacing arrangement is to be changed, it is necessary to remove the entire assembly from the arbor including the sleeve, spacers and saws. The assembly is slid off the gate end of the arbor and a new assembly is mounted in its place.

The saw assembly as described above is often heavy, the blades have sharp edges and the area around the saw assembly as mounted in the saw machine is crowded. Typically the saw assemblies are manually removed. The assemblies can weigh as much as or even more than 400 pounds. Manually removing the assemblies is hard work, dangerous and time consuming. Accordingly, it is an object of the present invention to mechanize the saw assembly changing procedure and thereby reduce the danger of injuries and also enable a more rapid changing time.

BRIEF DESCRIPTION OF THE INVENTION

The present invention in its preferred embodiment includes a specialized cart. The cart includes holding lugs (holders) that are elevated into engagement with the end nuts used to hold the saw assembly together. The gate is removed and a shaft extension is abutted against the arbor. Hydraulic cylinders are activated to pull the cart from a position under the arbor to a position under the shaft extension and thereby slide the saw assembly off the arbor and onto the shaft extension. The shaft extension with the saw assembly thereon is retracted from the arbor end. The saw assembly is then engaged by an overhead crane which removes the old assembly including the shaft extension and transfers it to a changing station. A new assembly mounted on a further shaft extension is placed on the cart. The free end of the shaft extension is advanced into engagement with the arbor end. The cart is then shoved back under the arbor which shoves the assembly off of the shaft extension and onto the arbor. The shaft extension is disconnected and withdrawn from the arbor, the gate is closed and with the arbor thereby fully supported by the bearing mount of the gate, the lugs of the cart are retracted. The cart remains dormant under the arbor until the next changeover.

Whereas the above description applies to a bottom gang saw, e.g., where the wood billets are moved across the top of the saws, a modification thereof makes it applicable also to overhead edge easer saws. The embodiment which is disclosed in the detailed description which follows utilizes both, the edge easer saw being used to provide a finishing bevel in the upper edges of the to-be-cut lumber pieces as will be explained further in the detailed disclosure which follows.

Whereas the above carrier for the bottom saw assembly is referred to as a cart, the upper carrier is referred to as a sled to differentiate the two. As explained above, the cart stays in place under the saw assembly during operation of the gang saw. This has the advantage that support lugs need only be retracted a slight amount and otherwise would have to be retracted the depth of the saws to allow the cart to slide out from under the saw assembly. As will be appreciated, the cart never has to slide relative to the saw assembly.

The sled has to contend with the anvil which supports the billet as the billet is moved through the overhead saws. The sled is thus designed to slide on the anvil and under the saw assembly. The upper saw assembly has smaller diameter blades and thus retraction of the lugs is not a problem. Also, the saw assembly is much lighter in weight and the movement of the lugs can be manually manipulated, e.g., through the use of camming levers. The sled is hydraulically shoved under the saw assembly along the anvil and when in place, an operator through the use of the camming levers raises the lugs into place under the end nuts. The shaft extender is placed against the arbor and the saw assembly is removed from the arbor much in the same manner as explained for the cart.

A further improvement is directed to the saw assembly itself. Saw assemblies are commonly kept to a "manageable" length and for most applications contemplated herein, the desired length is longer than the manageable length. Thus, the saw assembly is commonly split, i.e., having two sleeves that are placed end to end on the arbor. The split creates problems when organizing the saw blades and spacers for different sawing patterns.

The present invention provides as an alternative saw assembly, spacers that are sized and configured to fit directly onto the arbor, e.g., having a center opening with keyways that are matched to the arbor, and which interfit together with a saw blade therebetween, the saw blade rotatably fixed to the spacers. The entire assembly can be pulled apart and restructured with different spacers to achieve any desired sawing pattern. The arbor extension includes keys similar to the arbor and the entire assembly of spacers and saws is slid off the arbor and onto the arbor extension in the manner described above.

The structure and operation briefly described above will become more clearly understood and appreciated upon reference to the detailed explanation that follows and the drawings which are referred to therein.

BRIEF DESCRIPTION OF THE DRAWINGS

FIG. 1 is a schematic illustration of a saw machine including saw blade assemblies as contemplated for changing by the present invention;

FIG. 2 is a gang saw assembly as taken on view lines 2—2 of FIG. 1;

FIG. 3 is an edge easer saw assembly as taken on view lines 3—3 of FIG. 1;

FIGS. 4, 5 and 6 schematically illustrate a saw changer of the present invention changing the gang saw assembly of FIG. 1;

FIGS. 7 and 8 schematically illustrate a saw changer of the present invention changing the edge easer saw assembly of FIG. 1;

DETAILED DESCRIPTION

Figure 9:
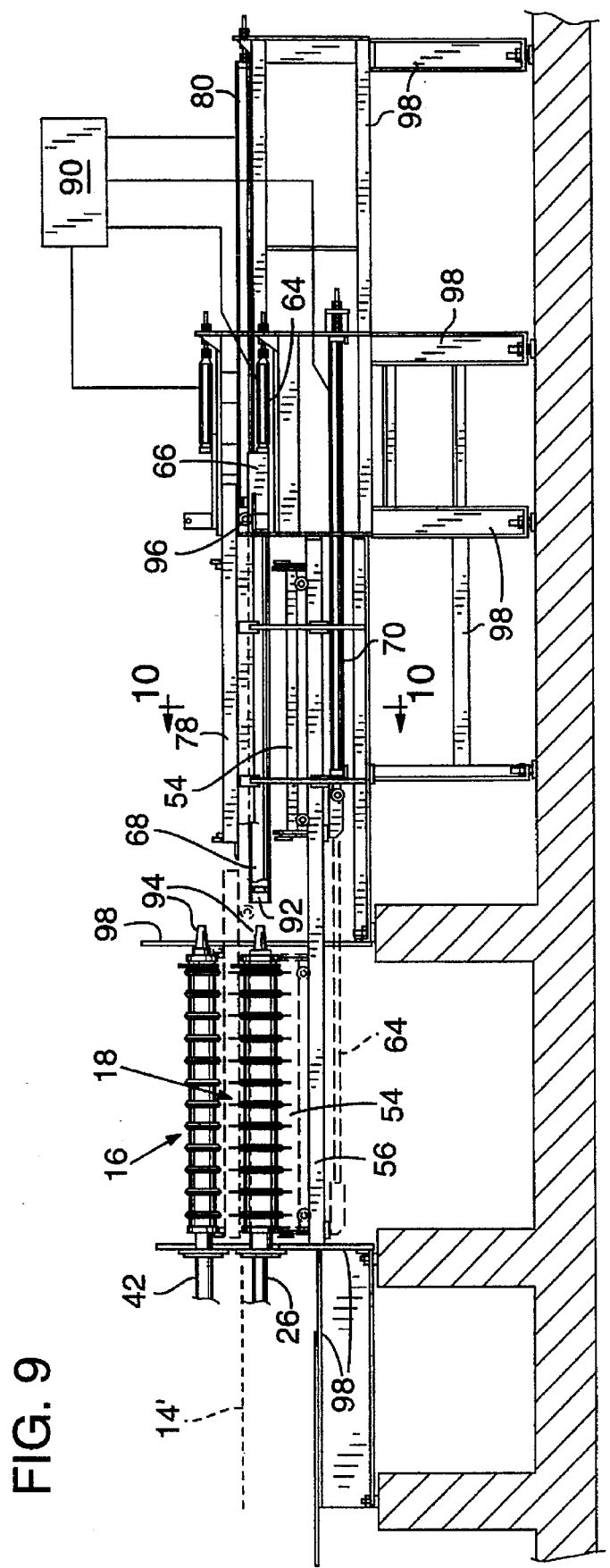
FIG. 9 is a side view of a saw machine and saw assembly changer for changing both assemblies of the saw machine.

The invention will first be described in general by reference to the schematic illustrations of FIGS. 1-8. With reference to FIG. 1, a conveyor 10 conveys a series of billets 12, e.g., eight feet in length and two inches high (the dimensions shown in the figure) and four feet in width. The billets 12 are passed from the conveyor 10 onto an anvil 14 and through an edge easer assembly 16 and then a gang saw assembly 18. With the billet 12 sawed into lumber pieces of the desired dimension, e.g., two inches by four inches by eight feet, the lumber pieces 12' are taken away by conveyor 20 for storage or further processing.

The gang saw assembly 18 is illustrated in cross section in FIG. 2 as indicated by section lines 2—2 in FIG. 1 and the edge easer machine 16 is illustrated in cross section in FIG. 3 as indicated by section lines 3—3 in FIG. 1.

With reference to FIG. 3, the edge easer machine 16 includes a motor 22 including a drive shaft 24 coupled to one end of an arbor 26. The arbor 26 is rotatably supported at its other end by a removable gate 28. Surrounding the arbor 26 are a pair of sleeves 30a and 30b which are keyed to the arbor and rotate with the arbor. Surrounding the sleeves 30 are edge easer blades 32 spaced apart by spacers 34. The blades 32 are rotatably fixed to the sleeves and end nuts 36 secure the blades and spacers to the sleeves. The sleeves 30, spacers 34, edge easer blades 32 and end nuts 36 are secured together for removal from the arbor as a unit and are referred to herein as an edge easer blade assembly. (The edge easer blades provide a shallow V-shaped groove in the top of the billet whereat the cut lines will be made by the gang saw to provide the lumber pieces 12' with beveled edges on the top edges of the pieces.)

The gang saw of FIG. 2 is similarly constructed. A motor 38 includes a drive shaft 40 which rotatably drives an arbor 42. The arbor 42 is rotatably supported at its opposite end by a removable gate 44. Sleeves 46a and 46b are key fit to the arbor 42 and saw blades 48 and spacers 50 are mounted to the sleeve and fixed to the sleeve by end nuts 52. The sleeves 46, spacers 50, saw blades 48 and end nuts 52 are secured together in the manner of the edge easer blade assembly. They are removable from arbor 42 as a unit and they are referred to herein as a saw assembly. (The blades 48 are provided with a cutting section 48a that provides a beveled edge on the bottom side of the lumber pieces similar to that of the top side provided by the edge easer blades.)

As previously explained, the invention is directed to the apparatus and process for changing the saw assembly. (In this context, the edge easer blade assembly is considered a saw assembly). A saw assembly, e.g., as illustrated in FIG. 2 and as described in the previous paragraph, is not new. Changing of the saw assemblies was previously accomplished by removing the gate 44 and manually sliding the assemblies, first the assembly of sleeve 46b, and then the assembly of sleeve 46a, off the arbor. Provision was made for supporting the assembly at the unsupported end (due to removal of gate 44) to alleviate bending and thereby binding of the sleeves on the arbor. The process was difficult, time consuming and dangerous. The present invention automates the process and is schematically illustrated in FIGS. 4-6.

Reference is made to FIG. 4 which illustrates the saw machine of FIG. 2 and including a schematic illustration of the saw blade changer of the present invention. In the illustration of FIG. 4, the saw machine is in operational mode. A movable cart 54 is mounted on tracks 56. A hydraulic hoist 58 is mounted at each end of the cart and a saddle holder 60 is mounted on each hoist 58. The holders 60 are configured to fit under and behind the end nuts 52. As will be appreciated, the hoists 58 are hydraulically operated to raise the saddle holder 60 into engagement with the end nuts to both support the weight of the saw assemblies and to trap the assemblies between the holders.

Reference is now made also to FIGS. 5 and 6. Positioned in spaced relation at the free end of the saw machine (the end opposite motor 38) is a power unit 62. The power unit 62 includes a first hydraulic cylinder 64 which is provided with a mandril 66 that releasably holds a shaft extender 68. The power unit 62 includes a second hydraulic cylinder 70 which is connected at 72 to the cart 54. Compare FIGS. 4 and 5. As will be noted, gate 44 has been removed, the hydraulic hoists 58 have raised the saddle holder 60 into engagement with end nuts 52, mandril 66 has been advanced by cylinders 64 to advance the shaft extender into abutting engagement with the exposed end of arbor 42, cylinder 70 has been activated to draw cart 54 toward the power unit 62 and in the process slide the saw assemblies from the arbor onto the shaft extender 68.

FIG. 6 illustrates the process of exchanging the shaft assemblies. Now compare FIGS. 5 and 6. An overhead hoist 74 including grapple lines 76, is engaged with the saw assembly still mounted on the shaft extender 68, and then first cylinder 64 retracts to release mandril 66 from the shaft extender 68. The hoist 74 then lifts the saw assembly and shaft extender off the saddle holders 60, carries the assembly to a work station, picks up a replacement saw assembly and shaft extender and returns to the position illustrated in FIG. 6.

It will be appreciated that the above-described process is then reversed. The mandril 66 is advanced to engage the shaft extender, the grapple lines are released, the replacement shaft extender is engaged with the arbor end, the cylinder 70 is activated to slide the saw assembly onto the arbor 42, the mandril is retracted, gate 44 is closed to support the arbor end, and the saddle holders are retracted to place the saw machine back to its operating condition of FIG. 4.

The procedure for changing the edge easer assembly is similar to that of the saw assembly and is illustrated in FIGS. 7 and 8. The primary difference is that a sled 78 is used instead of the cart and it is not left under the assembly during operation. FIG. 7 illustrates the condition during operation. Thus, the sled has to be slid under the blade assembly after the gate 28 is removed. The sled 78 is supported on the anvil 14 and moved back and forth by a third cylinder 80 of power unit 62. The sled and its holders 82 are designed to have a low profile to fit under the blades 32. These blades are, however, substantially smaller in diameter than blades 48 of the gang saws. The edge easer assembly is not as heavy and the holders 82 are manually cam actuated into position to support end nut 36 as generally indicated in FIG. 8. Shaft extender 84, held by mandril 86 and activated by the cylinder 88, is abutted against the arbor 26, and cylinder 80 is actuated to draw the edge easer assembly onto the shaft extender 84. The process is otherwise a repeat of the process described for FIGS. 4–6 except, of course, the sled 78 is withdrawn prior to closing of gate 28 with FIG. 7 illustrating the position of operation for the edge easer.

FIG. 9 illustrates a saw machine incorporating both the overhead edge easer and the gang saw including the components for changing the saw assemblies of each, as schematically illustrated and described for FIGS. 4–8. In FIG. 9, most of the structure of the saw machine is removed for clarity. Those skilled in the art will appreciate that the saw machine is of standard construction and that the invention involves a saw blade changing mechanism. Thus, the drive motors, frame, shroud and input and output conveyors are not included in the illustration and will not be described.

Referring to FIG. 9, the edge easer assembly 16 and gang saw assembly 18 are illustrated in operative positions. Not shown is the anvil 14 which establishes the feed path for the billets 12. Dash lines 14' identify the level at which the billets would be fed through the saw machine. The arbors 26 and 42 are supported by a motor at one end and a gate at the opposite end and neither is illustrated in FIG. 9. The reader is referred to FIGS. 2 and 3 for illustration of these components.

The cart 54 is illustrated in its normal position (during operation of the saw machine) in dash lines and in its retracted position in solid lines. The cart 54 would only appear in the retracted position during changeover. The solid line position is believed to best illustrate the manner by which the cart is controlled in its movement on the rails 56 which dictates the path, and by the cylinder-piston 70. A control panel 90 controls actuation of the cylinder-piston 70 as does it control other automated mechanism of the changeover system.

A shaft extender 68 is illustrated suspended above the cart 54 and is held by the mandril 66 engaged by the piston or rod of cylinder 64. The free end of the shaft extender 68 is sectioned to illustrate a pocket 92 in the end of the shaft extender that receives the conical end 94 of the arbor 26 for coupling the shaft extender and arbor during transfer of the saw assembly.

The sled 78 is coupled to the piston of cylinder 80 at 96 for moving the sled 78 into and out of position under the edge easer assembly 16. The various frame components employed for supporting the cylinders and selected mechanism is generally identified by the reference number 98.

Figure 10:
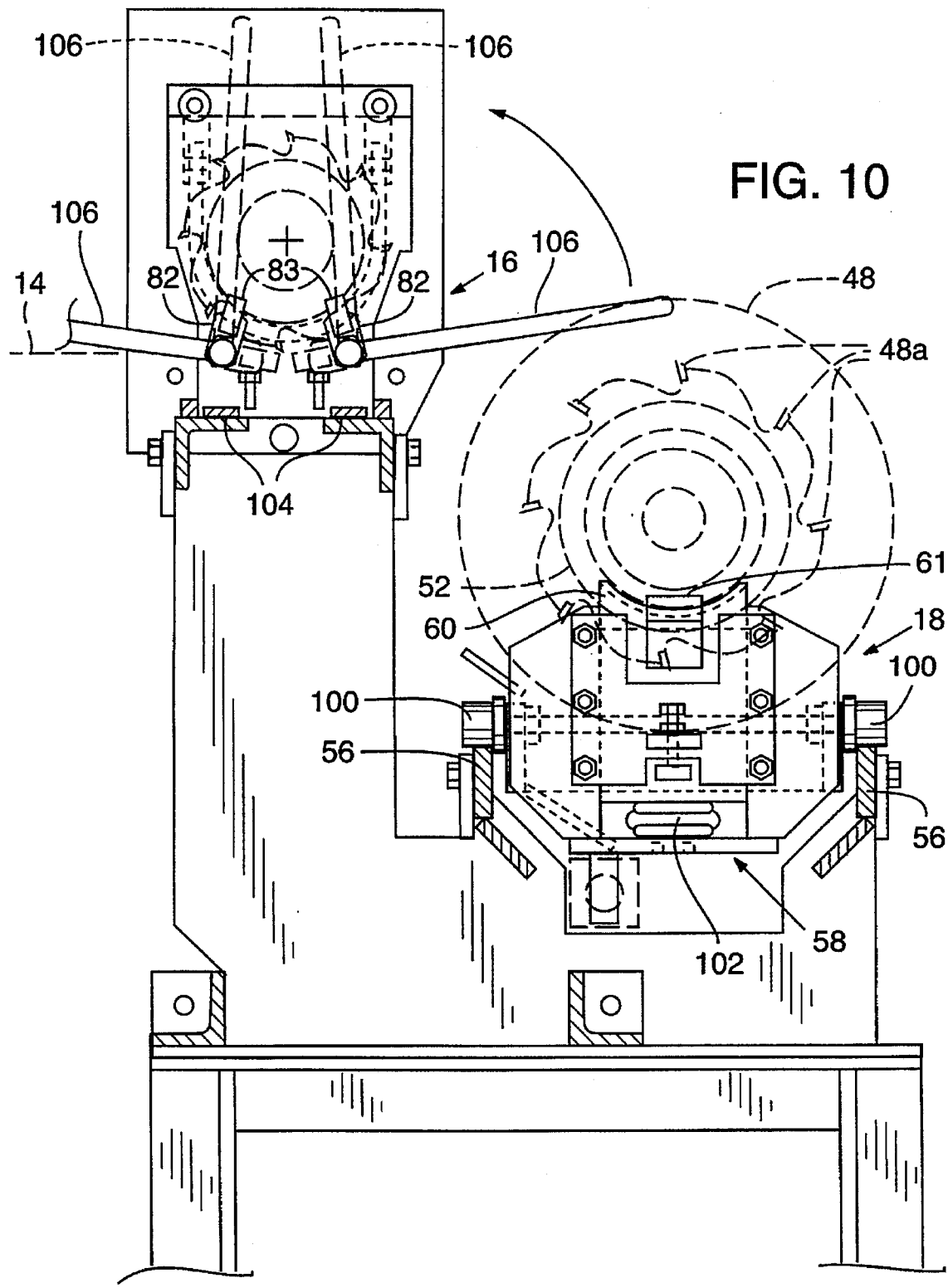
FIG. 10 is a view taken on lines 10—10 of FIG. 9.
Figure 13:
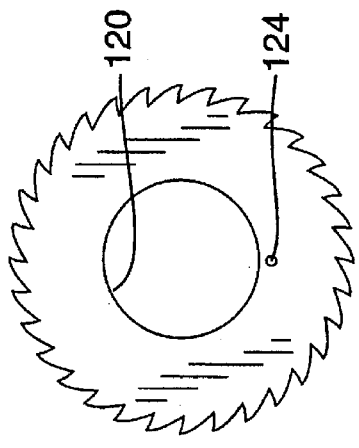
FIG. 13 is a side view of a saw blade mounted to the saw assembly.

Attention is now directed to FIG. 10 as taken on section lines 10—10 of FIG. 9 (but again with certain of the structure removed for clarity). FIG. 10 is provided to illustrate the mechanism associated with the cart 54 and sled 78 for grasping and supporting the saw assembly. Thus, the view of FIG. 10 assumes that the cart and sled are both in place under the saw assemblies and the holders are raised into position and supporting the saw assembly.

Referring first to the gang saw assembly 18, the dash line illustrates the periphery of the saw blade 48. Teeth 48a bevel the edges of the lumber pieces 12' as previously explained. Rails or tracks 56 support the wheels 100 of the cart 54. As illustrated, hoists 58 raise and lower holders 60 that are raised into engagement with end nut 52. Expansion and contraction of lift 102 produces raising and lowering of the holders 60. Note finger portion 61 of holder 60 that overlaps the edge of end nut 52. A similar finger portion 61 overlaps the opposite end nut and in combination insures movement of the saw assembly with the cart.

With reference now to the edge easer assembly 16, the sled 78 is provided with bearing strips 104 that facilitate sliding movement of the sled across the anvil 14. The profile of the sled as illustrated in FIG. 9 is low enough (except the "free" end which does not slide under the assembly) to slide under the blades for placement of the holder 82 under the end nuts 36. Note finger portions 83 in dash lines which are similar to finger portions 61 of holders 60. The holders 82 pivot from a position just below the blades into engagement with the end nuts. The pivoting is accomplished manually using the levers 106. As will be noted, the levers 106 are pivoted to the dash line position to pivot the holders against the nut. The levers are pivoted to an over-the-center position and the holders are held in place by the downward pressure applied by the weight of the saw assembly. Whereas the levers are provided only on the free end of the sled, accessible for manual pivoting, the lever action is transferred to the holders at the opposite end via a shaft that extends between the holders and which are not shown.

Sleeveless Saw Assembly

Figure 15:
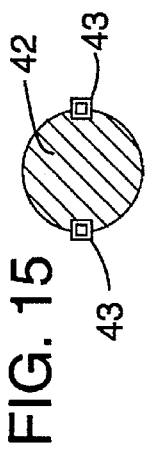
FIG. 15 is a section view of an arbor to which the saw assembly of FIGS. 11-14 is fit.
Figure 14:
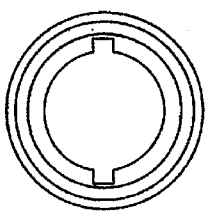
FIG. 14 is an end view of one of the spacers of the saw assembly.

Attention is now directed to FIGS. 11–15. Illustrated is a saw assembly comprised of saw blades 108 and center spacers 110. The spacers 110 are provided with a center bore 112 and key slots 114. FIG. 15 illustrates a cross section of the arbor 42 which is provided with keys 43. The spacer center bore 112 fits onto the arbor 42 with the keys 43 aligned and fitted to the key slots 114. (In the prior saw assembly, it is the sleeve that is provided with key slots and fitted to the arbor.)

Each of the center spacers is configured to have a projecting flange 116 at one end, and an inset 118 at the other end sized to fit the flange 116. The saw blade 108 has a center bore 120 that also fits the flange 116. In assembly, a saw blade 108 is placed over the flange 116 of a center spacer, a pin 122 is inserted through a hole 124 in the blade and into an aligned hole 126 in the flange side of the spacer. The next spacer 110 is fitted with its inset nested into the flange 116 of the first spacer and abutted against the saw blade 108. A pin hole 128 in the inset side of the spacer is fitted to the pin 122. This process is repeated until all of the spacers and saw blades are assembled. Note, however, that the pin may be fixedly mounted, e.g., in hole 126 and the blade and next spacer simply fit onto the pin.

Figure 11:
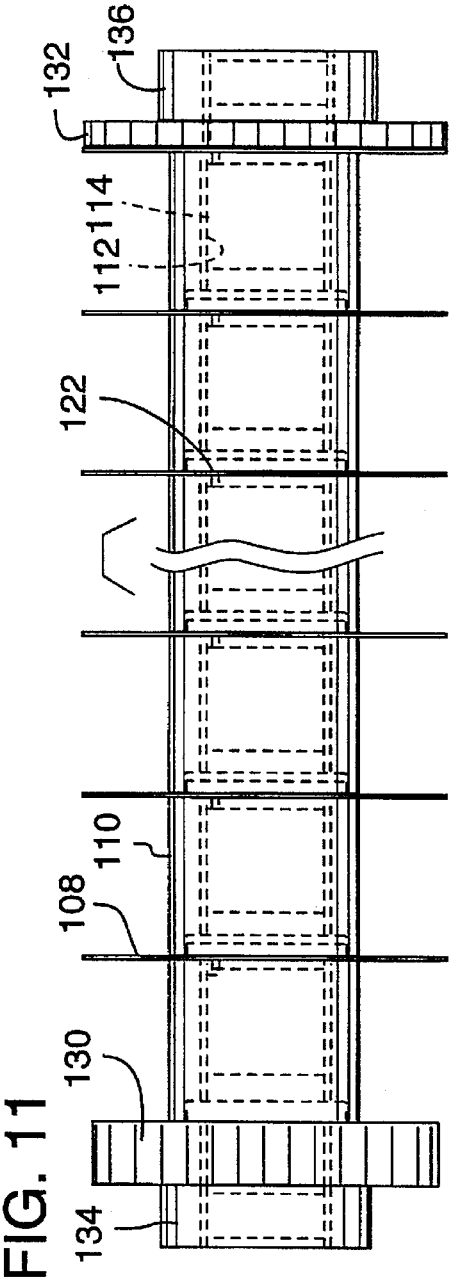
FIG. 11 is a side view of a modified saw assembly.
Figure 12:
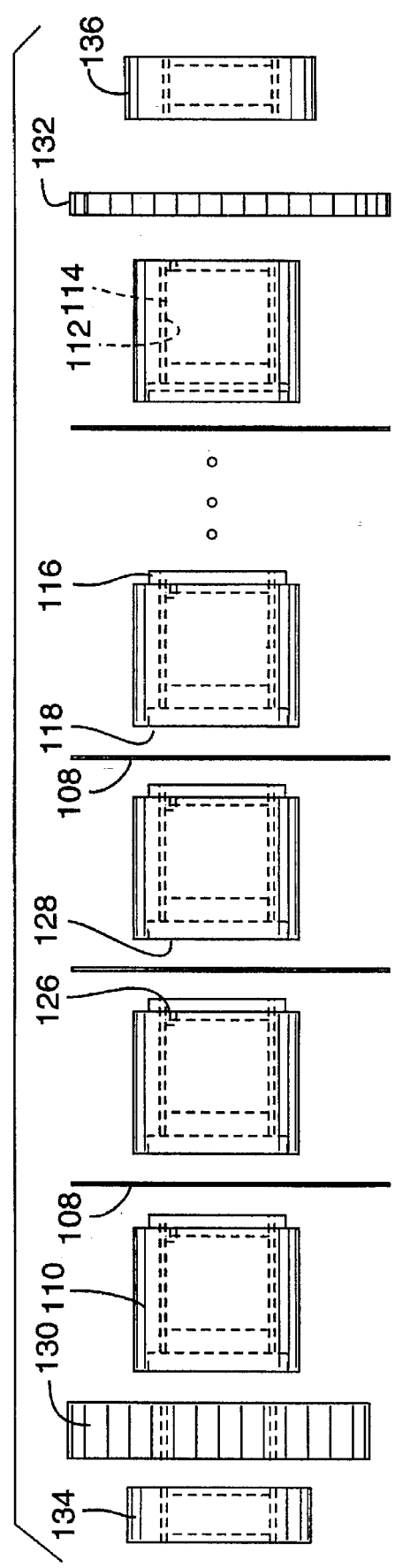
FIG. 12 is an exploded view of the saw assembly of FIG. 11.

The illustration of FIGS. 11–12 show chippers 130, 132 and end spacers 134, 136 assembled to each end of the center spacer-saw blade assembly. Although not shown, this would be accomplished by simply abutting the end components as mounted on an arbor or arbor extension.

It will be appreciated that the spacers provide the function of the spacers and sleeve of the prior embodiment, and end spacers 134, 136 function as the end nuts. Thus, spacers 134, 136 are slightly greater in diameter and are adapted to receive the holder 60 (or 82 in the case of the edge easer) for sliding the entire assembly on and off the arbor/arbor extension. In a known manner, the entire saw blade assembly when assembled to the arbor for cutting operation, is clamped together by securing nuts that are threadably engaged with the arbor at each end thereof.

As will be appreciated, the components are not otherwise secured together and the assembly of components is moved as a unit by the cart/sled holders. The components are readily disassembled to allow sharpening or other maintenance and readily reassembled onto an arbor extension. The arbor extension is preferably provided with keys that line up the components to enable easy movement onto the arbor keys. Changing the spacing between saw blades is readily completed by replacing the spacers and the assembler need not be concerned about where the saws or spacers are located as in the embodiments employing sleeves.

With the above description, those skilled in the art will readily be able to practice the invention. The invention is not, however, limited to the specific details as illustrated in FIGS. 9 and 10 as there are many forms that various ones of the components can take. The invention is the automation of the saw assembly changing process without substantially redesigning the basic saw machine. The cart and sled can be readily added to existing saw machines and these units provide support for the assemblies and through the power and controls of the power unit, the cart and sled can be manipulated into and out of the saw machine. This enables the use of overhead cranes to move the saw assembly between work stations and a minimal amount of effort is required. It will also be appreciated that the changing process is readily accomplished in a far shorter time than has been previously provided through manual manipulation.

The invention is accordingly encompassed by the definition of the claims appended hereto.

I claim:

1. A mechanized saw assembly changer for a sawing machine comprising:

a saw assembly removably mounted to an arbor on the saw machine and a motor rotatably driving the arbor from one end, and a removable support supporting the arbor on an opposite end;

a movable carrier movable between a first position under the saw assembly mounted to the arbor and a second position out from under the arbor at said opposite end;

a first power source powering the movement of the movable carrier between said first and second positions;

holders movably mounted on said carrier and movable between a raised position in contact with a saw assembly mounted on the arbor and a retracted position away from the saw assembly; and mechanism for raising the holders of the carrier to the second position with the carrier in the first position and thereby controllably mounting the saw assembly to the carrier, a control for moving the carrier and assembly to the second position and thereby exposing the saw assembly for replacement.

2. A mechanized saw assembly changer as defined in claim 1 including:

a shaft extender movable into and out of aligned abutment with the arbor at said opposite end whereby with the shaft extender abutting the arbor, moving the saw assembly off the arbor moves it onto the shaft extender, said shaft extender and saw assembly movable away from the arbor and to a work station for repair and replacement.

3. A mechanized saw assembly changer as defined in claim 2 wherein said saw machine includes an overhead edge easer saw assembly and a bottom gang saw assembly, and a movable carriage for each saw assembly.

4. A mechanized saw assembly changer as defined in claim 1 wherein said power source is a cylinder-piston motor assembly having its cylinder anchored to a power unit and its piston attached to the carrier, said control actuating said motor on command to move the carrier between said first and second position.

5. A mechanized saw assembly changer as defined in claim 4 wherein said carrier remains positioned under the saw assembly during sawing operation whereby said holders do not have to pass under the saw blades of the saw assembly.

6. A mechanized saw assembly changer as defined in claim 5 wherein the holders include a bottom portion supporting the weight of the saw assembly and a finger portion that engages an end edge of the saw assembly to effect movement of the saw assembly off the arbor.

7. A process for changing a saw assembly mounted on an arbor of a saw machine and rotatively supported at its ends, said process including:

providing a carrier including holders adapted to carry the saw assembly;

placing the carrier under the saw assembly;

raising the holders into engagement with the saw assembly;

removing one end support from the arbor;

moving the carrier and saw assembly along the arbor and off the end having the end support removed; and removing the saw assembly from the carrier and replacing it with a replacement saw assembly for placement on the arbor.

\* \* \* \* \*